(12) United States Patent
Ross

(10) Patent No.: US 6,520,302 B1
(45) Date of Patent: Feb. 18, 2003

(54) BRAKE SYSTEM

(75) Inventor: Amara Ross, 3236 Golden Ave., Long Beach, CA (US) 90806

(73) Assignee: Amara Ross, Long Beach, CA (US)

(\*) Notice: Subject to any disclaimer, the term of this patent is extended or adjusted under 35 U.S.C. 154(b) by 0 days.

(21) Appl. No.: 09/738,412

(22) Filed: Dec. 14, 2000

(51) Int. Cl.[7] ................................................. F16F 9/12
(52) U.S. Cl. ...................................................... 188/268
(58) Field of Search ................................. 188/268, 276, 188/322.5; 192/125 C, 58.1–58.8

(56) References Cited

U.S. PATENT DOCUMENTS 4,610,341 A \* 9/1986 Hauser et al. ............. 192/58.6
5,201,392 A \* 4/1993 Kramer ....................... 188/268

\* cited by examiner

Primary Examiner—Jack Lavinder
Assistant Examiner—C. T. Bartz

(57) ABSTRACT

There is disclosed herein a device which can function either as a brake or as a clutch and which relies upon the application of fluid which, under sufficient pressure, becomes essentially solid thereby providing substantial friction between a moving disk and a stationery housing. The device includes a stationery housing having therein a rotating disk within a chamber in the housing. A fluid is applied to the chamber, and when the pressure on the fluid is sufficiently increased it becomes substantially a solid thereby essentially locking together the disk and the housing to provide a braking or clutching action.

19 Claims, 6 Drawing Sheets

BRAKE SYSTEM

BACKGROUND OF THE INVENTION

Various forms of brakes and brake systems are well known and have been used for years. For example, brakes have been used on automobiles from the beginning. In the early days of wheeled devices, the first brakes are believed to have been some sort of chock or anchor. In the early days of the bicycle a "spoon" brake involved a lever that pressed a block of wood against the wheel. In the early 1900's, the internal expanding drum brake was developed. Since then, numerous forms of brakes for automobiles and other devices have been developed.

Today, the typical brakes on automobiles are disc brakes, although drum brakes are still used. Disc brakes use a clamping action to produce friction between a rotor and pads mounted in a caliper attached to a suspension and actuation system. Inside the calipers, are pistons which press against the pads as a result of pressure generated in a master cylinder. The pads then rub against the rotor, thereby slowing the vehicle. Drum brakes usually use two semi-circular shoes to press outward against the inner surfaces of a steel drum. Older cars often had drum brakes on two or four wheels, and many new cars now have four wheeled disc brakes.

Other forms of brakes have been developed and used in various forms of equipment. Examples are electromagnetic brakes and clutches which usually include two rotors with magnetic particles disbursed in the air gap between both rotors, and an electric current passing through an associate coil creates a magnetic field which aligns the magnetic power into the gap. The higher the current, the more rigid the connection between the two rotors becomes.

As is known, the various forms of drum and disc brakes involve a number of moving parts and components. The electromagnetic particle brakes also suffer from several disadvantages, including a number of components, but also they may not be sufficiently effective at low RPM, and there can be problems in keeping the powder homogeneously between the gap between the rotors, and heat dissipation can be a problem.

SUMMARY OF THE INVENTION

The present invention is characterized by relative simplicity compared to prior brakes and brake systems. In its simplest form, it comprises a stationery housing containing a rotating disk therein with a shaft affixed to the disk and extending from the housing. The disk has a plurality of holes therethrough. Suitable bearings and seals are provided between the housing and disk, and the braking action is provided as a result of applying a pressurized fluid through a fluid port in the housing and into the cavity therein around and through the holes in the rotating disk. The fluid preferably is a polybutene grease which becomes solid through the application of pressure, but which is suitably liquid when the pressure is released. The device can be used either as a brake or a clutch, has no replicable parts, and no required maintenance.

Accordingly, it is the principal feature of the present invention to provide a new form of brake or clutch.

Another feature of the resent invention is to provide a new form of brake or clutch relying on a pressurizable fluid applied within a housing to controllably restrict the rotation of a rotating disc within the stationery housing.

BRIEF DESCRIPTION OF THE DRAWINGS

These and other objects and features of the present invention will become better understood through a consideration of the following description taken in conjunction with the drawings in which.

DETAILED DESCRIPTION

Figure 1:
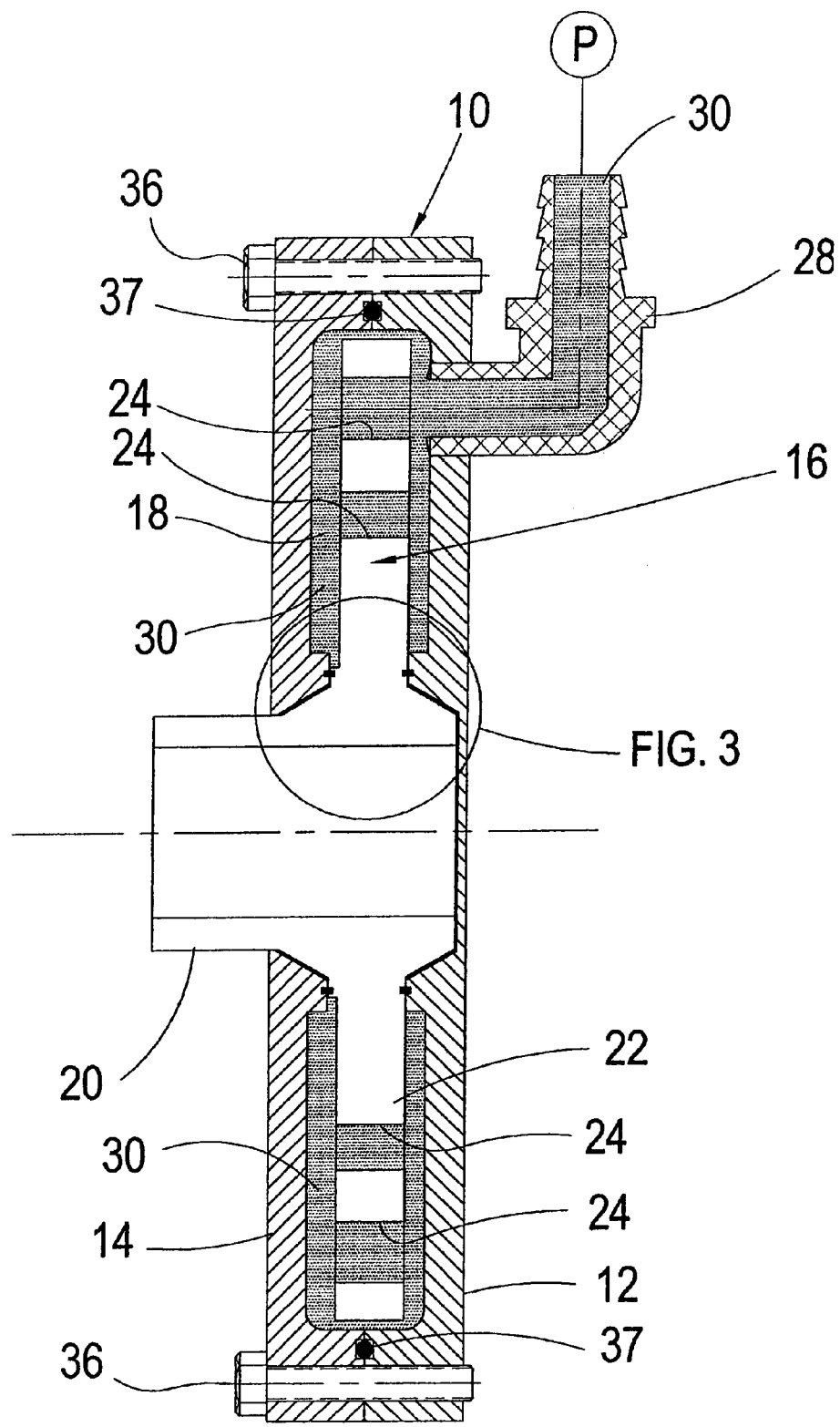
FIG. 1 is a cross-sectional view of an exemplary device according to the present invention principally designed as a brake.
Figure 2:
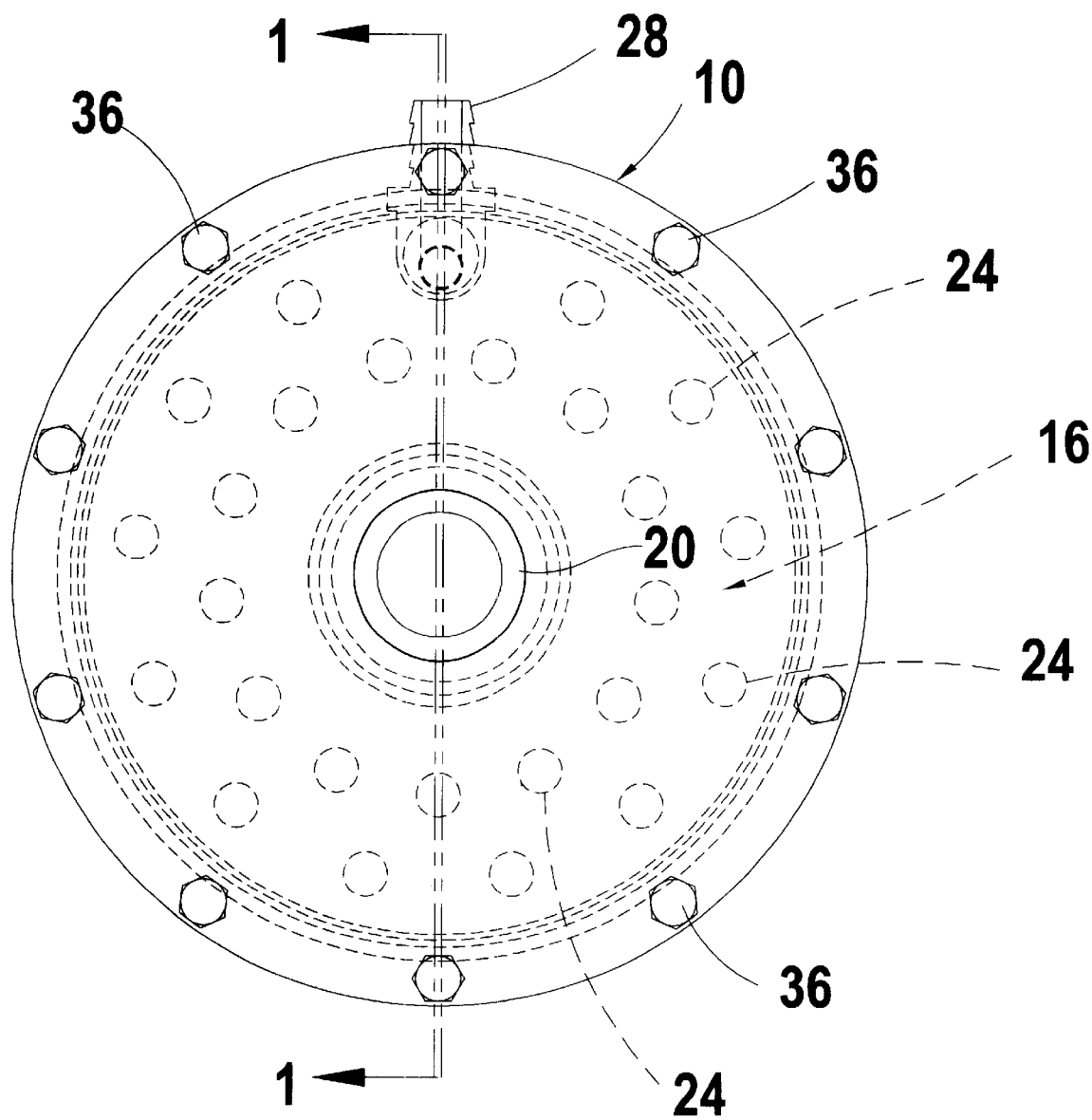
FIG. 2 is a side elevational view of the device, FIG. 1 being taken along lines 1—1 of FIG. 2.

Turning now to the drawing, an exemplary brake is illustrated in FIGS. 1 through 3 and 5. The brake includes a housing 10 comprising first and second, or rear and front, housing rings or sections 12 and 14, and a rotary disc 16 disposed within an inner cavity 18 in the housing 10. The disk 16 includes a flange 20 extending outwardly through the front housing 14 and to which a shaft can be attached, such as a shaft onto which an automobile wheel (not shown) would be attached. The rotary disk 16 includes a flat disk section 22 having a plurality of holes 24 therethrough. A fluid inlet port 28 is attached to the rear housing 12 for directing fluid 30 into the housing, and into the cavity 18 and through the holes 24 in the disk 16. As will be explained further, when this fluid is supplied under suitable pressure, it becomes solid to essentially "lock" the disk 16 within the housing 10, thereby providing a braking action.

Turning to additional details of the structure, the front and rear housings are held together by a plurality of suitable bolts 36, and the two housing halves are sealed by a sealing O-ring 37 to keep fluid 30 from leaking out between the halves 12 and 14 of the housing 10. The fluid inlet port 28 preferably is affixed to the rear housing 12 by threading the port into the rear housing 12 in a conventional manner.

Figure 3:
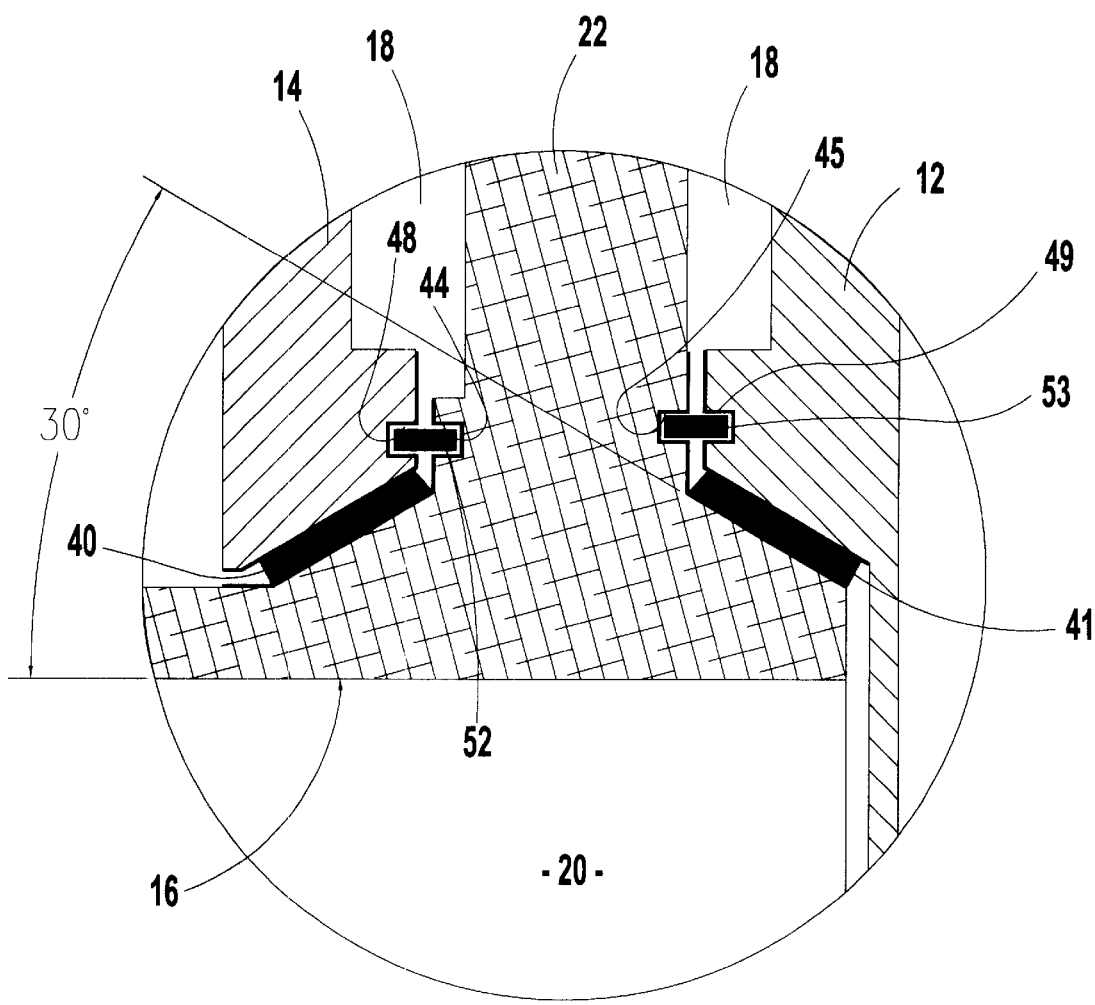
FIG. 3 is a detailed sectional view of the area identified as FIG. 3 in FIG. 1.

Of particular importance, are the bearing and sealing arrangements between the disk 16 and the housing 10, and this is shown in greater detail in FIG. 3 which is an enlarged sectional view of the circled section identified as FIG. 3 in FIG. 1. As can be seen from FIG. 3, self lubricated plastic bearings 40, 41 are provided around the center portion of the disk 16. The bearing surfaces adjacent the bearings 40, 41 can have applied thereto a baked dry film coating 54 to reduce friction. In particular, note the further detailed drawing of FIG. 5 which omits the bearings 40, 41 so that the location of the coating 54 is clear. Thus, the entire bearing surfaces adjacent to bearings 40 and 41 are coated at 54, as are the surfaces adjacent bearings 52 and 53 which are described below. Preferably the coating 54 is a baked dry film coating which is only approximately 25 millionth inch thick. The coating 54 can be, for example, Everlube 620C available from Engineered Coating Solutions.

The tapered shape bearings 40, 41 are squeezed in place between the dry film surfaces 54 and, thus, each of the bearings 40 and 41 and the film coatings 54 fill up the gap between the disks 16 and respective housing sections 12 and 14. The bearings, 40, 41 typically are 0.005–0.100 inch thick. The angle of the bearings 40, 41 as seen in FIG. 3 with respect to the center of the disk 16 preferably is 30°.

The fluid cavity 18 is sealed in a manner to prevent the fluid 30 from leaking out past the bearings 40, 41. For this purpose, the disk 16 includes annular grooves 44, 45 and the housing sections 14 and 12 include similar annular grooves 48, 49. Circular or ring shaped bearings 52 and 53 are disposed in the annular grooves 44, 45 and 48, 49. The bearings 40, 41 preferably are Teflon (TFE) or TFE or Poly Urethane, 80D shore durometer based bearings and preferably a TFE based lubricant is also used.

As noted earlier, the fluid 30 preferably is a polybutene grease or lubricant which becomes more viscous and can become solid upon the application of sufficient pressure, and which is liquid when the pressure is released. Since this fluid solidifies under pressure and fills the cavity 18 and extends through the holes 24 in the disks 16, the braking action previously noted is created, thereby stopping rotation of the disk 16 with respect to the housing 10. An example fluid 30 is a polybutene lubricant sold by Amoco Chemicals Corporation, but other fluids which become sufficiently solid under pressure can be used.

The brake device of the present invention can be used for any application requiring a brake, such as for the wheels on cars, airplanes, trailers, and the like and whether the wheels are driven wheels or not. Although the flange 20 is shown as only extending through the front housing 14, a like flange can be included on the other side of the disk and through the back housing 12 to provide a through shaft which extends through the housing 10 of the present device. Also, the device of the present invention can function as a clutch between the rotary disk 16 and, in this case, a rotatable housing 10.

Figure 4:
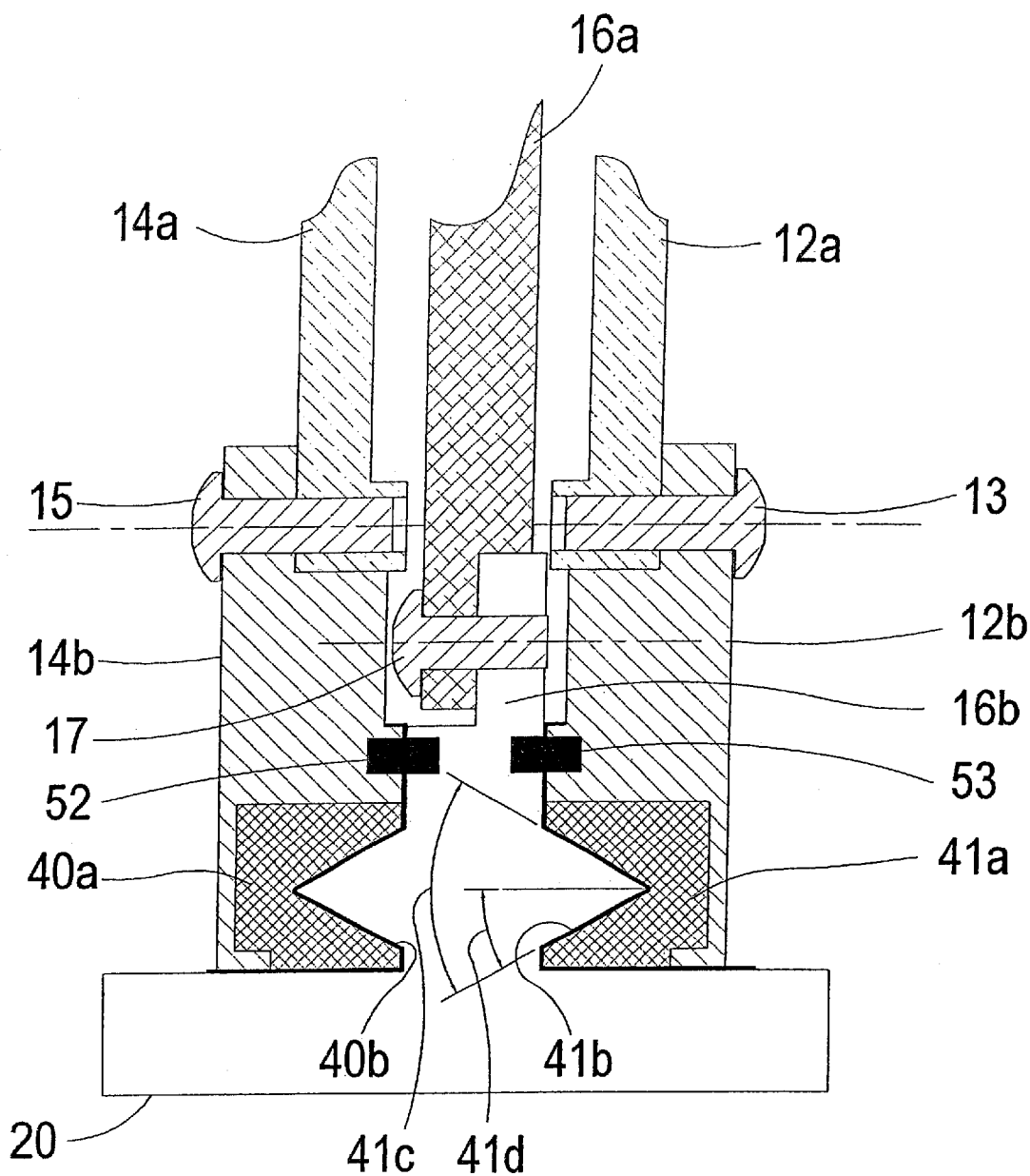
FIG. 4 shows details of an alternative embodiment.
Figure 5:
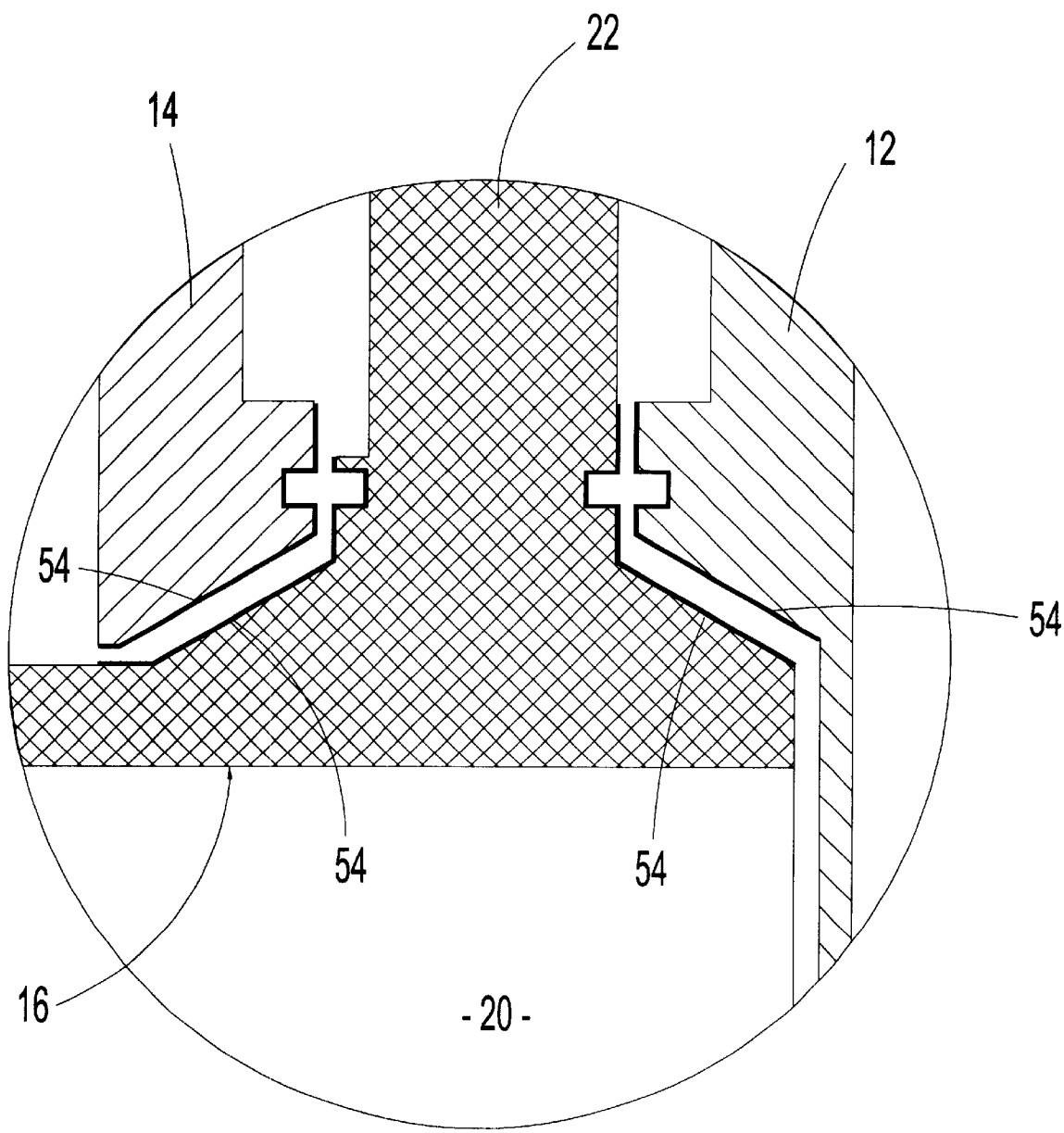
FIG. 5 is a further detailed view of the structure in FIG. 3, to better illustrate, a coating at bearing surfaces.
Figure 6:
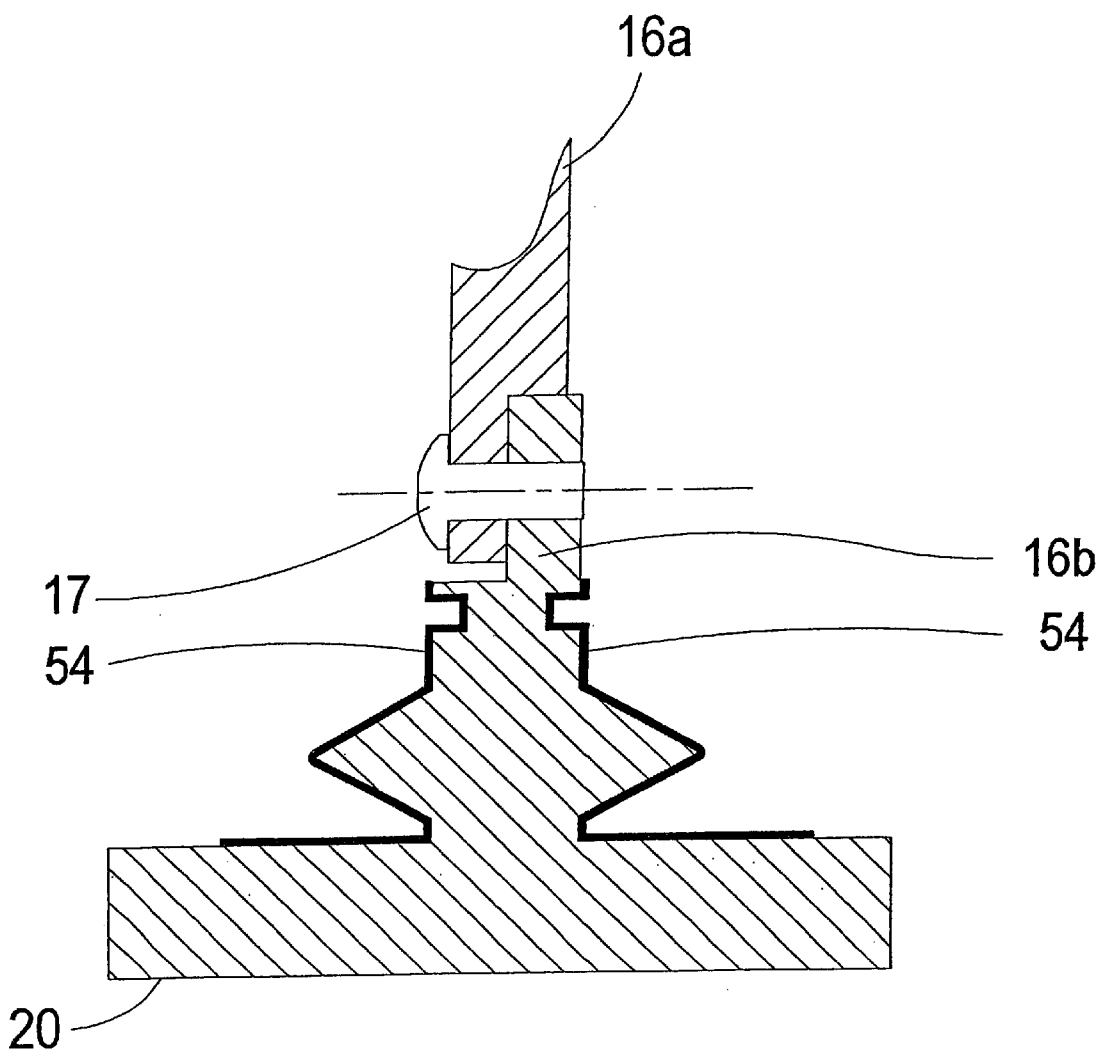
FIG. 6 is a further detailed view of the embodiment in FIG. 4 for a better showing of a coating at bearing surfaces

FIGS. 4 and 6 illustrate an alternative arrangement of a sealed bearing design for a brake system. In this embodiment, the housing sections 12 and 14 of FIG. 1 are in respective sections 12a, 12b and 14a, 14b for ease of assembly. The same is true of the disk which is in sections 16a and 16b. Thus, housing sections 12b and 14b comprise a center section, and the sections 12a and 14a comprise an outer section, and these pairs of sections are held together by a series of bolts 13 and a series of bolts 15. Similarly, the disk sections 16a and 16b are held together by a series of bolts 17. As will be appreciated, the bolts 13, 15 and 17 preferably are evenly spaced around their respective housing members and disk.

Other than the sectioned components, the major difference in this embodiment is the bearing system comprising bearings 40a and 41a. These bearings have a facing "V" groove configuration 40b and 41b as shown in FIG. 4 wherein the included total angle 41c preferably is 59 degrees and the lower included angle 41d preferably is 29 degrees. The bearings 40a and 41a are self-lubricated plastic bearing liners, preferably formed from polyurethane.

In this embodiment, the baked dry film coating 54 is applied only to outer surfaces of the central section 16b of the disk, 16 as seen FIG. 6. A like coating is not required on the housing sections 12b and 14b inasmuch as the bearings 40a and 41a are fixed in housings sections 14a and 12a respectively. No coating 54 is applied to bearings 40a and 41a because such a coating thereon is not necessary. As with the embodiment of FIGS. 1, 2, 3 and 5, in this embodiment the bearing surfaces and "V" bearings surfaces 40b and 41b of bearings 40a and 41a do not touch any metal surfaces, just the coating 54.

While embodiments of the present invention have been shown and described, various modifications may be made without departing from the scope of the present invention, and all such modifications and equivalents are intended to be covered.

What is claimed is:

1. A device for providing a brake or clutch action adapted to be between a stationery part and a rotating part wherein a first of the parts comprises a housing for the second part, the housing having a cavity therein to which a fluid under pressure can be applied to substantially increase the viscosity of the fluid to thereby lock the two parts, and the housing is a stationery housing comprising two sections coupled together to provide a sealed cavity therein, the second part is a rotating disk disposed within the cavity, the disk having a plurality of holes to allow the fluid to flow therethrough, the housing includes a port for receiving the fluid and through which pressure may be applied to increase the viscosity of the fluid within the cavity and in the holes to provide a breaking action.

2. A device as in claim 1 wherein the housing is formed of sections coupled together to facilitate assembly.

3. A device as in claim 1 wherein the disk comprises sections which are coupled together to facilitate assembly.

4. A device as in claim 1 including bearing liners comprising a pair of circular bearing liners disposed in respective housing sections, and each includes a "V" groove into which a "V" section of a central portion of the disk is disposed to rotate.

5. A device as in claim 1 comprising bearings disposed between a portion of the disk and the housing sections, and further includes leak seals between the disk and housing to prevent the fluid from leaking from the device.

6. A device for providing a brake or clutch action adapted to be between a stationery part and a rotating part wherein a first of the parts comprises a housing for the second part,
  the housing having a cavity therein to which a fluid under pressure can be applied to substantially increase the viscosity of the fluid to thereby lock the two parts, and the housing is a stationery housing comprising two sections coupled together to provide a sealed cavity therein,
  the second part is a rotating disk disposed within the cavity, the housing including a port for receiving the fluid and through which pressure may be applied to increase the viscosity of the fluid within the cavity, and
  bearings disposed between a portion of the disk and the housing sections, and further including leak seals between the disk and housing to prevent the fluid from leaking from the device, and wherein the bearings comprise a pair of circular bearing liners disposed in the respective housing sections.

7. A device for providing a brake or clutch action using a fluid which changes in viscosity upon the application of pressure comprising
  a two part housing comprising first and second sections coupled and sealed together and defining a cavity within the housing,
  a circular disk disposed within the housing for rotation within and with respect to the housing,
  a fluid pressure port coupled to the housing and into which the fluid can enter and be pressurized wherein a substantial increase in the pressure of the fluid increases the viscosity of the fluid to thereby substantially increase the friction between the disk and the interior of the housing, and
  bearings disposed between a central portion of the disk and the housing, and further including leak seals between the disk and housing to prevent the fluid from leaking from the device, and including a baked dry film coating on the disk and housing adjacent to the bearings.

8. A device as in claim 7 wherein surfaces of the disk and housing sections have thereon baked dry film coating in the area thereof where the bearing liners are disposed.

9. A device as in claim 7 wherein the bearings comprise a pair of circular bearing liners disposed in respective housing sections, and each includes a "V" groove into which a "V" section of a central portion of the disk is disposed to rotate.

10. A device for providing a brake or clutch action using a fluid which changes in viscosity upon the application of pressure comprising a two part housing comprising first and second sections coupled and sealed together and defining a cavity within the housing, a circular disk disposed within the housing for rotation within and with respect to the housing, a fluid pressure port coupled to the housing and into which the fluid can enter and be pressurized wherein a substantial increase in the pressure of the fluid increases the viscosity of the fluid to thereby substantially increase the friction between the disk and the interior of the housing, and bearings disposed between a central portion of the disk and the housing, and further including leak seals between the disk and housing to prevent the fluid from leaking from the device, including a baked dry film coating on the disk adjacent to the bearings.

11. A device for providing a brake or clutch action using a fluid which changes in viscosity upon the application of pressure comprising a two part housing comprising first and second sections coupled and sealed together and defining a cavity within the housing, a circular disk disposed within the housing for rotation within and with respect to the housing, and a fluid pressure port coupled to the housing and into which the fluid can enter and be pressurized wherein a substantial increase in the pressure of the fluid increases the viscosity of the fluid to thereby substantially increase the friction between the disk and the interior of the housing, the fluid comprising a polybutene lubricant.

12. A device for providing a brake or clutch action using a fluid which changes in viscosity upon the application of pressure comprising a two part housing comprising first and second sections coupled and sealed together and defining a cavity within the housing, a circular disk disposed within the housing for rotation within and with respect to the housing, wherein the disk having a plurality of holes to allow the fluid to flow therethrough, and a fluid pressure port coupled to the housing and into which the fluid can enter and be pressurized wherein a substantial increase in the pressure of the fluid increases the viscosity of the fluid to thereby substantially increase the friction between the disk and the interior of the housing to provide a braking action.

13. A device as in claim 12 wherein the housing has formed sections coupled together to facilitate assembly.

14. A device as in claim 12 wherein the disk comprises sections which are coupled together to facilitate assembly.

15. A device as in claim 12 further including bearings disposed between a central portion of the disk and the housing, and further includes leak seals between the disk and housing to prevent the fluid from leaking from the device.

16. A method for braking comprising the steps of applying a liquid between a stationery member and a rotating member, and increasing the pressure on the liquid to substantially increase its viscosity to substantially increase the friction between the stationery member and the rotating member to provide a braking action.

17. A method as in claim 16 wherein the rotating number comprises a circular disk.

18. A method for clutching comprising the steps of applying a liquid between a stationery member and a rotating member, and increasing the pressure on the liquid to substantially increase its viscosity to substantially increase the friction between the stationery member and the rotating member to provide a clutching action.

19. A method of providing a brake or clutch action adapted to be between a stationery part and a rotating part wherein a first of the parts comprises a housing for the second part, and the housing having a cavity therein to which a liquid under pressure can be applied to substantially increase the viscosity of the liquid, comprising the step of increasing the viscosity of the liquid to substantially increase the friction between the stationery part and the rotating part.

* * * * *